US011332083B2

(12) United States Patent
Sovern et al.

(10) Patent No.: US 11,332,083 B2
(45) Date of Patent: May 17, 2022

(54) PROTECTIVE COVER FOR ELECTRICAL COUPLER OF VEHICLE SHOCK ABSORBER AND VEHICLE SHOCK ABSORBER INCLUDING SAME

(71) Applicant: Honda Motor Co., Ltd., Tokyo (JP)

(72) Inventors: Jason A. Sovern, Marysville, OH (US); Seth A. Ritchie, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 76 days.

(21) Appl. No.: 16/844,282

(22) Filed: Apr. 9, 2020

(65) Prior Publication Data

US 2021/0316677 A1 Oct. 14, 2021

(51) Int. Cl.
*F16F 9/46* (2006.01)
*B60R 16/02* (2006.01)
(Continued)

(52) U.S. Cl.
CPC ........ *B60R 16/0215* (2013.01); *B60G 13/003* (2013.01); *B60G 13/08* (2013.01); *F16F 9/19* (2013.01); *F16F 9/512* (2013.01); *H01R 13/50* (2013.01); *B60G 2202/24* (2013.01); *B60G 2204/128* (2013.01); *B60G 2204/202* (2013.01); *B60G 2206/41* (2013.01); *B60G 2500/11* (2013.01); *B60G 2600/182* (2013.01); *B60G 2800/162* (2013.01); *F16F 9/065* (2013.01); *F16F 2222/12* (2013.01); *F16F 2228/066* (2013.01); *F16F 2230/0023* (2013.01); *F16F 2230/18* (2013.01); *H01R 2201/26* (2013.01)

(58) Field of Classification Search
CPC ...... F16F 9/34; F16F 9/38; F16F 9/325; F16F 9/446; F16F 9/464
USPC .................. 188/266.3–266.6, 322.13, 322.2
See application file for complete search history.

(56) References Cited

U.S. PATENT DOCUMENTS 7,967,117 B2 * 6/2011 Abe .......................... F16F 9/54
188/299.1
8,770,594 B2 7/2014 Tominaga et al.
(Continued)

FOREIGN PATENT DOCUMENTS

CN 206338358 U 7/2017
JP 2014062584 A 4/2014
(Continued)

*Primary Examiner* — Christopher P Schwartz
(74) *Attorney, Agent, or Firm* — Kenealy Vaidya LLP

(57) ABSTRACT

A shock absorber for damping movement of a wheel suspension system of a vehicle can include a damper tube, a piston, a damping adjustment assembly, and a protective cover. The damper tube can contain a fluid. The piston can be located in the damper tube so as to accommodate relative movement between the damper tube and the piston. The damping adjustment assembly can be connected to the damper tube, and can include a reservoir, a solenoid valve, and a wire harness connection. The solenoid valve can be in fluid communication with each of the reservoir and the damper tube and configured to selectively open and close fluid communication between the reservoir and the damper tube. The wire harness connection can be in electrical communication with the solenoid valve. The protective cover can contain the wire harness connection.

20 Claims, 6 Drawing Sheets

(51) Int. Cl.
*B60G 13/00* (2006.01)
*F16F 9/19* (2006.01)
*F16F 9/512* (2006.01)
*H01R 13/50* (2006.01)
*B60G 13/08* (2006.01)
*F16F 9/06* (2006.01)

(56) References Cited

U.S. PATENT DOCUMENTS

| | | | |
|---|---|---|---|
| 9,046,145 B2 | 6/2015 | Murakami et al. | |
| 10,215,250 B2* | 2/2019 | Tanabe | F16F 9/3207 |
| 2002/0030311 A1* | 3/2002 | Beck | F16F 9/06 |
| | | | 267/64.11 |
| 2016/0010716 A1 | 1/2016 | Keida et al. | |

FOREIGN PATENT DOCUMENTS

| | | |
|---|---|---|
| JP | 2016020704 A | 2/2016 |
| KR | 19990033341 A | 5/1999 |
| WO | 2018097148 A1 | 5/2018 |

\* cited by examiner

PROTECTIVE COVER FOR ELECTRICAL COUPLER OF VEHICLE SHOCK ABSORBER AND VEHICLE SHOCK ABSORBER INCLUDING SAME

BACKGROUND

The disclosed subject matter relates to a an adjustable shock absorber More particularly, the disclosed subject matter relates to methods and apparatus for protecting an electric coupling on the shock absorber.

A shock absorber can control the amount of travel for the vehicle wheel suspension and/or a rate of travel of the vehicle wheel suspension in order to achieve a desired ride comfort level during operation such as during constant speed cruising and/or to achieve a desired performance and handling level during cornering, braking, acceleration and/or relatively high speed travel. An adjustable shock absorber can provide a plurality of different damping settings, where each setting is tuned to provide a dynamic performance of the wheel suspension that is best suited for the given dynamic condition(s) of the vehicle. For example, a soft setting can provide a relatively soft damping that can be advantageous for providing a smooth ride over an uneven travel surface. In contrast, a stiff setting can be advantageous during cornering, braking, acceleration or landing on the travel surface after cresting a hill.

An actively adjustable shock absorber can include one or more valves controlled by an electronic control unit in response to or in anticipation of an uneven road surface or one or more dynamic conditions of the vehicle. For example, the active shock absorber can be actively adjusted to allow a longer suspension travel while traversing an uneven travel path, when appropriate, and actively adjusted to reduce the amount of suspension travel in order to limit roll, dive, squat, or bottoming of the suspension, when appropriate.

SUMMARY

Some embodiments are directed to a shock absorber for damping movement of a wheel suspension system of a vehicle. The shock absorber can include a damper tube, a piston, a damping adjustment assembly, and a protective cover. The damper tube can contain a fluid. The piston can be located in the damper tube so as to accommodate relative movement between the damper tube and the piston. The damping adjustment assembly can be connected to the damper tube, and can include a reservoir, a solenoid valve, and a wire harness connection. The solenoid valve can be in fluid communication with each of the reservoir and the damper tube and configured to selectively open and close fluid communication between the reservoir and the damper tube. The wire harness connection can be in electrical communication with the solenoid valve. The protective cover can contain the wire harness connection.

Some embodiments are directed to a protective cover for an electrical coupler of a vehicle shock absorber. The shock absorber can have a damper tube, a reservoir, a valve housing, and a solenoid valve mounted in the valve housing and in fluid communication with each of the damper tube and the reservoir. The electrical coupler can be in electrical communication with the solenoid valve. The solenoid valve can be configured to selectively open and close fluid communication between the damper tube and the reservoir. The protective cover can include a first wall, a second wall, a third wall, a fourth wall, and a peripheral edge. The first wall can be configured to extend along the electrical coupler when the protective cover is connected to the shock absorber. The second wall can be configured to extend along the electric coupler when the protective cover is connected to the shock absorber. The second wall can oppose and be spaced away from the first wall such that the electrical coupler is located between the first wall and the second wall when the protective cover is connected to the shock absorber. The third wall can be connected to and extend from each of the first wall and the second wall. The fourth wall can be connected to each of the first wall, the second wall, and the third wall and configured to extend along the electrical coupler when the protective cover is connected to the shock absorber. The peripheral edge can be spaced from the third wall. Each of the first wall, the second wall and the fourth wall can extend from the third wall to the peripheral edge. The electrical coupler can be located between the third wall and the peripheral edge when the protective coupler is connected to the shock absorber.

Some embodiments are directed to an adjustable shock absorber for damping movement of a wheel suspension system of a vehicle. The adjustable shock absorber can include a damper tube, a piston, a solenoid valve housing, a reservoir, a solenoid valve, a wire harness connection, and a protective cover. The damper tube can contain a fluid. The piston can be located in the damper tube so as to accommodate relative movement between the damper tube and the piston. The solenoid valve housing can be centered about a longitudinal axis, and connected to and extend away from the damper tube along the longitudinal axis. The reservoir can be connected to and extending away from the solenoid housing. The solenoid valve can be located in the solenoid valve housing, in fluid communication with each of the reservoir and the damper tube, and configured to selectively open and close fluid communication between the reservoir and the damper tube. The wire harness connection can be in electrical communication with the solenoid valve. The protective cover can be partially wrapped around the solenoid valve housing and the wire harness connector such that the protective cover includes an opening spaced away from each of the wire harness connection and the longitudinal axis and extending substantially parallel to the longitudinal axis.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

Figure 1:
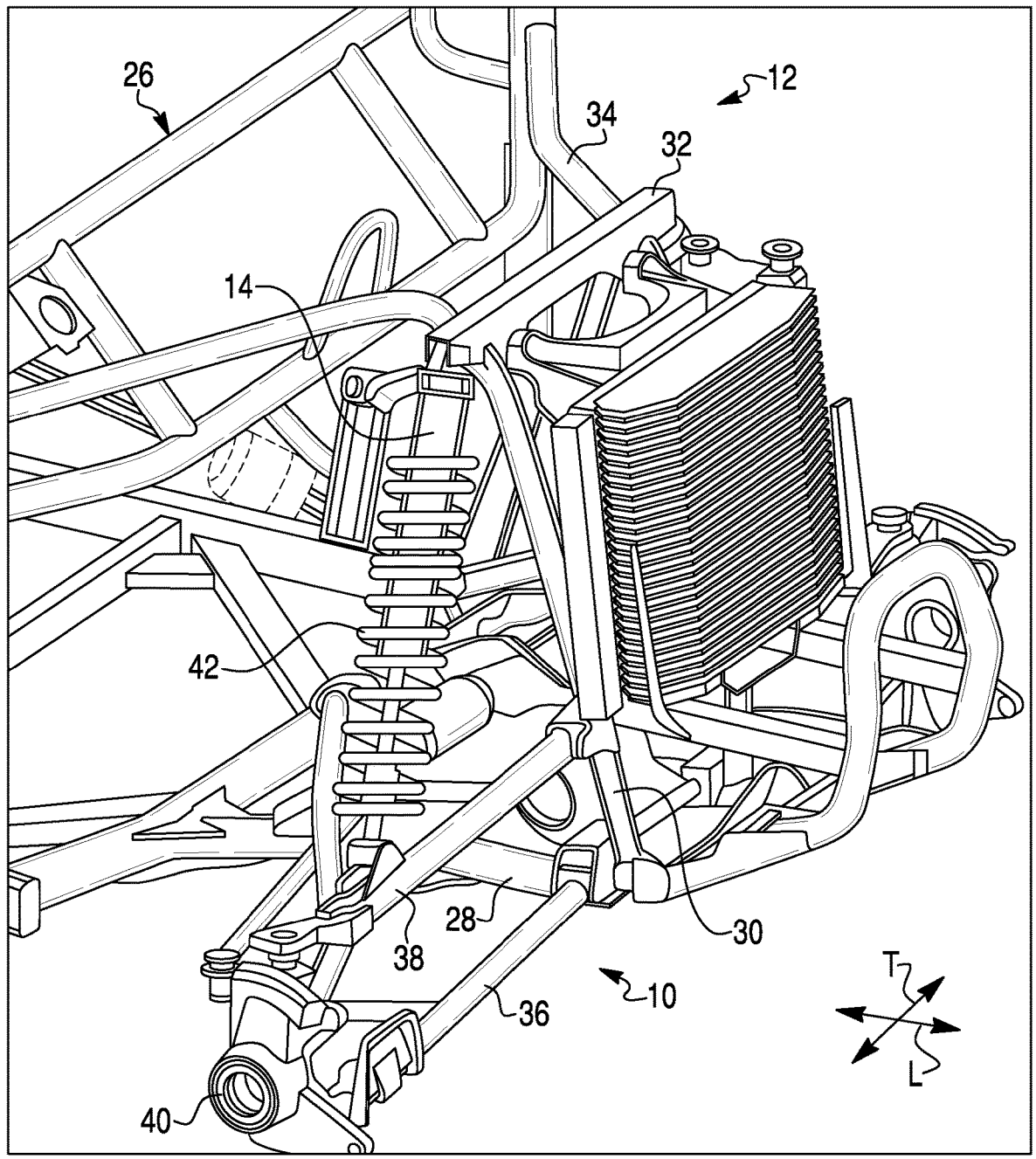
FIG. 1 is a perspective view of a front portion of a vehicle including a suspension system made in accordance with principles of the disclosed subject matter.

FIG. 1 illustrates an embodiment of a wheel suspension system 10 for a vehicle 12 made in accordance with principles of the disclosed subject matter. The vehicle 12 shown in FIG. 1 is specialized for use on an unimproved path or on an unmarked path, and can be referred to as a multipurpose utility vehicle (MUV) or as a side-by-side all-terrain vehicle (SxS, or SxS ATV). Thus, the vehicle 12 can traverse extreme surface contours including but not limited to rocks and boulders where a relatively large amount of suspension travel for the wheel suspension system 10 can be advantageous, or hills that have a steep peak or a steep downslope where a stiff damper setting can be advantageous for the impending compression stroke of the wheel suspension 10.

Figure 2:
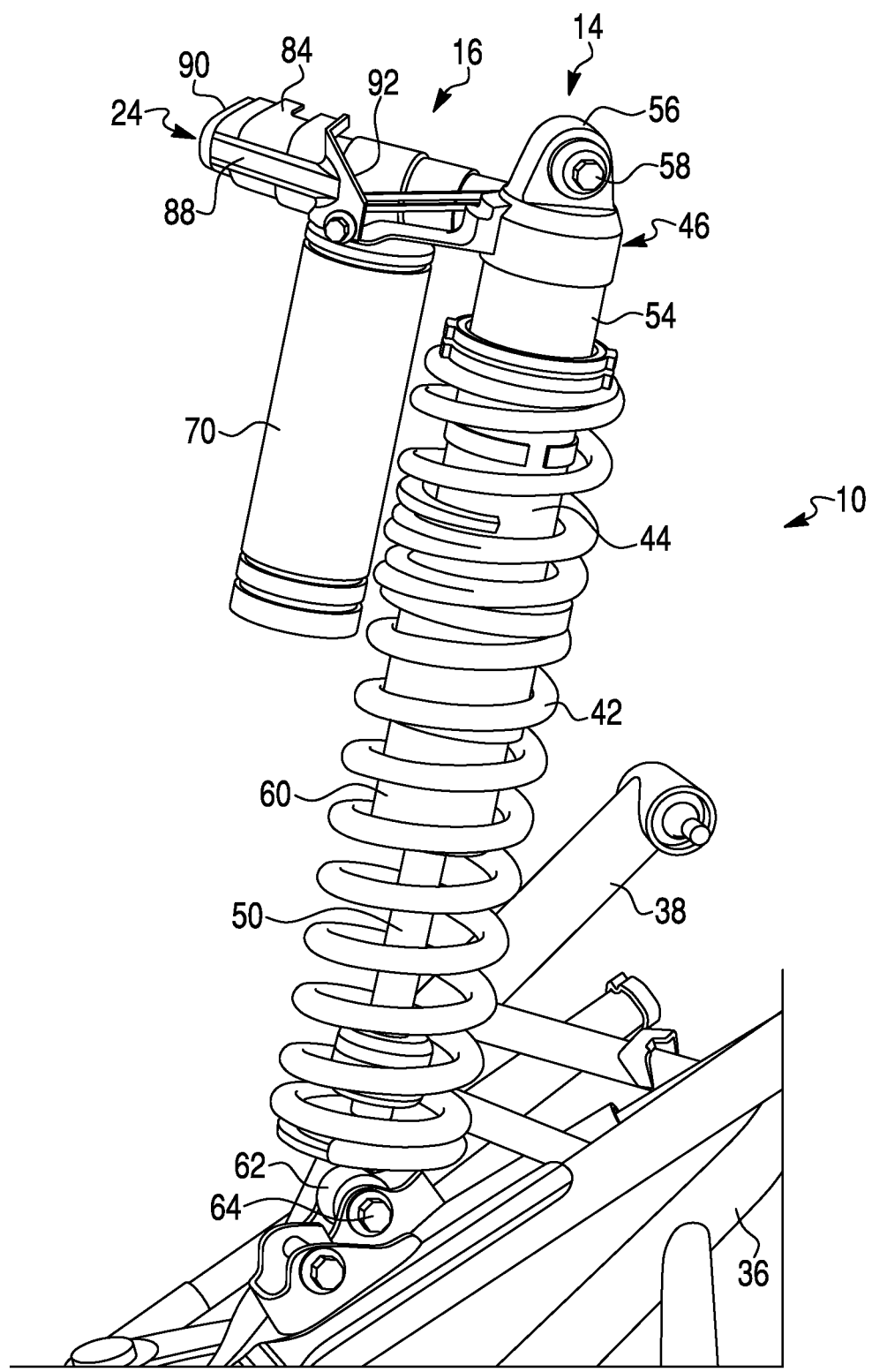
FIG. 2 is a perspective view of the suspension system of FIG. 1 including a shock absorber.

Referring to FIGS. 1 and 2, the wheel suspension system 10 can include a shock absorber 14 (also referred to as a cushion or a damper) that is actively adjustable to provide a plurality of damper settings incrementally ranging from a relatively soft setting providing a relatively small damping force to a relatively stiff setting providing a relatively large damping force. The shock absorber 14 can include a damping adjustment assembly 16 that is electronically controlled to vary the damping setting within the range of settings in accordance with the real-time condition(s) and/or anticipated condition(s) of the vehicle 12 and/or the travel surface. The damping adjustment assembly 16 can be configured to selectively adjust the damping setting for the shock absorber 14 based on any appropriate condition(s) of the vehicle 12 such as but not limited to a relative position of the suspension system 10, yaw angle, roll angle, pitch angle, yaw rate, roll rate, pitch rate, steering input, brake pressure, engine speed, and selected transmission gear ratio.

Figure 3:
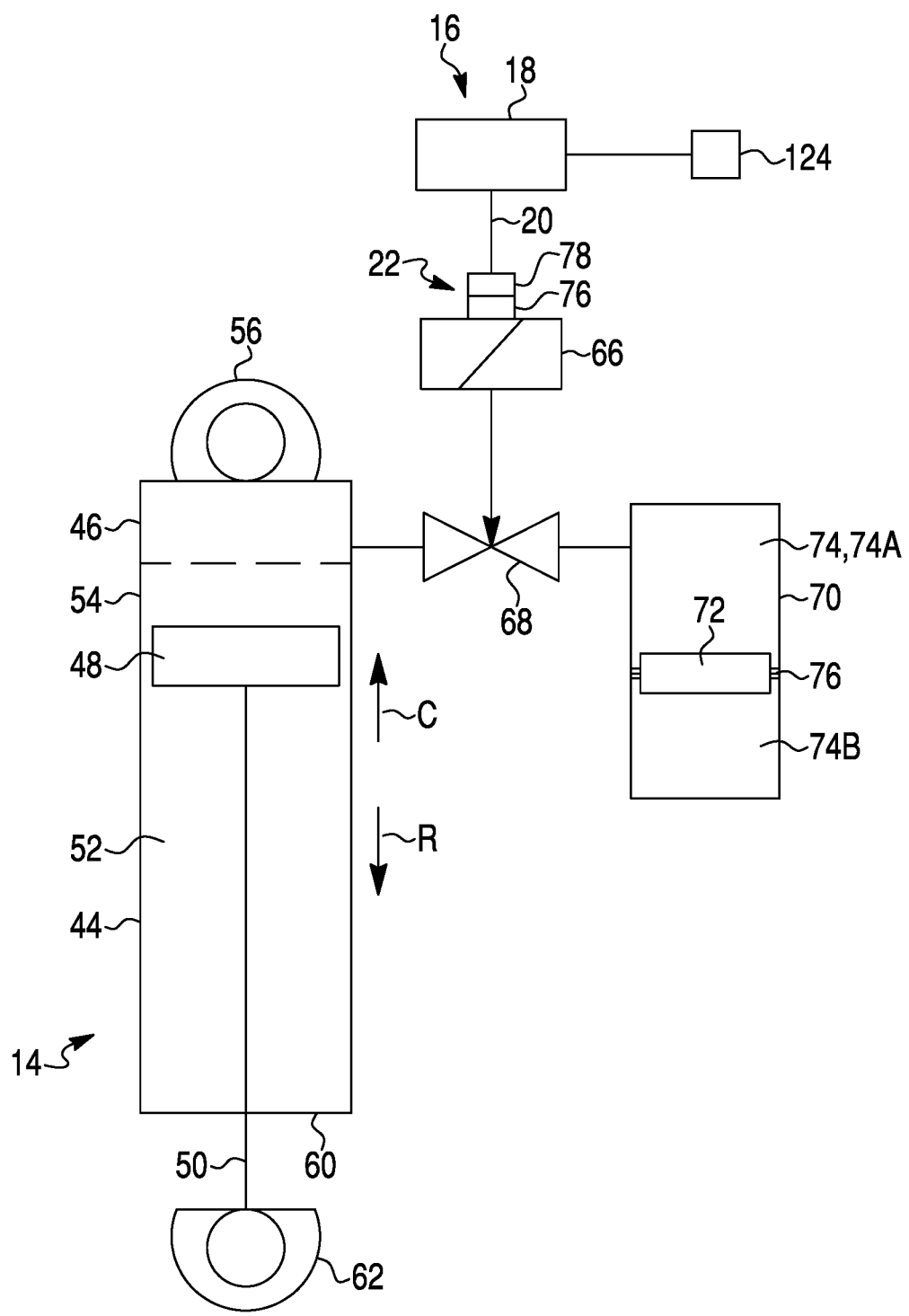
FIG. 3 is a schematic view of the shock absorber of FIG. 2.

Referring to FIG. 3, the damping adjustment assembly 16 can include a controller 18 that is in electrical communication with the shock absorber 14 via a wire harness 20. The damping adjustment assembly 16 can include a wire harness connection 22 (also referred to as an electrical connection, electrical connectors or electrical couplers) that electrically connects the wire harness 20 to the shock absorber 14. Since the vehicle 12 can be configured for travel across an unimproved path, it is possible for the vehicle 12 to encounter objects such as but not limited to tree branches, shrubs, or rocks or substances such as but not limited to water, mud, or sand that could come into contact with and damage or disconnect the wire harness connection 22. The shock absorber 14 can include a protective cover 24 that can be configured to wrap around at least a portion of the wire harness connection 22 in order to shield the wire harness connection 22 from contact with external objects along the travel path of the vehicle 12 or to prevent water intrusion into the wire harness connection 22 from water splash during riding or pressure washing. Further details of the damping adjustment assembly 16 and the protective cover 24 will be provided below.

Referring to FIG. 1, the vehicle 12 can include a frame assembly 26 that includes a plurality of frame members connected together in any appropriate manner. The wheel suspension system 10 can be connected to certain one(s) of the frame members in any appropriate manner and at any appropriate location to achieve the dynamic performance desired for the vehicle 12. For example, the wheel suspension system 10 can be connected to a first frame member 28, a second frame member 30 and a cushion bracket 32.

The wheel suspension system 10 can support the right front wheel of the vehicle 12. The vehicle 12 can include a left front suspension system that supports the left front wheel and is obscured from view in FIG. 1. The left front wheel suspension system can be a mirror image of the right front wheel suspension system 10. The left front wheel suspension system can be connected to a third frame member 34 and a fourth frame member that is obstructed from view in FIG. 1. The cushion bracket 32 can be connected to and span between the second frame member 30 and the third frame member 34.

The wheel suspension system 10 can include a lower linkage 36, an upper linkage 38, a wheel hub 40 and a coil spring 42. The lower linkage 36 can be pivotally connected to each of the wheel hub 40 and the first frame member 28 in any appropriate manner. The upper linkage 38 can be pivotally connected to each of the wheel hub 40 and the second frame member 30 in any appropriate manner. Referring to FIGS. 1 and 2, the shock absorber 14 can be connected to the cushion bracket 32 and the upper linkage 38 in any appropriate manner such that the shock absorber 14 can pivot with respect to the cushion bracket 32 and the upper linkage 38. The shock absorber 14 can be centered within and pass through the coil spring 42. The coil spring 42 can be connected to different portions of the shock absorber 14 that move relative to one another. The coil spring 42 can be connected to the shock absorber 14 in any appropriate manner.

Referring to FIGS. 2 and 3 collectively, the shock absorber 14 can include a damper tube 44, a body cap 46, a piston 48 and a piston rod 50. The damper tube 44 can include a chamber 52 which contains a damping fluid. The piston 48 can be located in the chamber 52 and movable through the fluid in a compression stroke direction C and a rebound stroke direction R.

Figure 5:
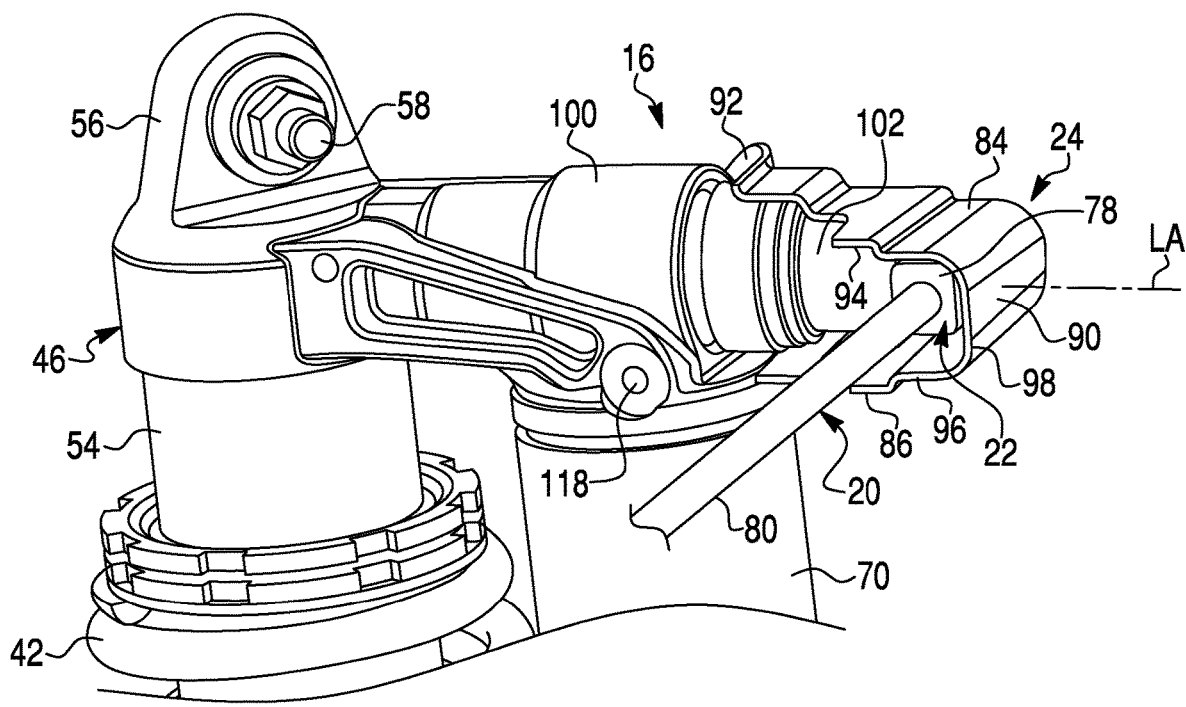
FIG. 5 is a partial perspective view of the shock absorber of FIG. 2 with the protective cover and the wire harness attached.
Figure 8:
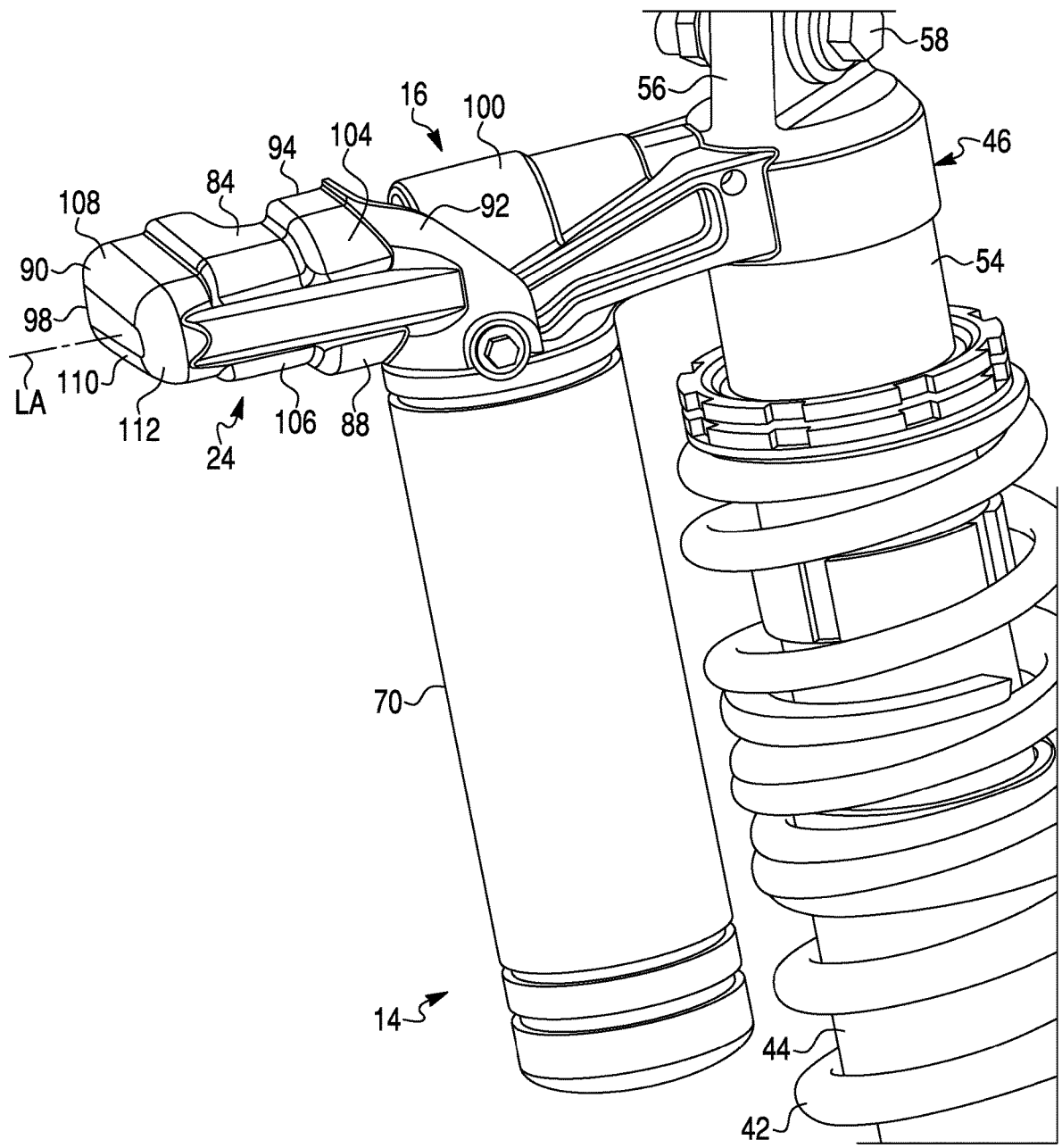
FIG. 8 is a partial perspective view of the shock absorber of FIG. 2 with the protective cover attached and the wire harness removed and showing a front view of the protective cover.

The body cap 46 can be connected to a first end 54 of the damper tube 44 and in fluid communication with each of the chamber 52 and the damping adjustment assembly 16. The body cap 46 can be connected to the damper tube 44 in any appropriate manner such as but not limited to mechanical fastener(s), adhesive, welding, staking, crimping or any combination thereof. The body cap 46 can be connected to the cushion bracket 32 in any appropriate manner that can permit the shock absorber 14 to pivot with respect to the cushion bracket 32. For example, the body cap 46 can include a mounting eye 56 that is connected to the cushion bracket 32 in any appropriate manner such as but not limited to a threaded fastener 58 as shown in FIGS. 2, 5 and 8. The body cap 46 can pivot about the longitudinal axis of the threaded fastener 58.

Returning to FIGS. 2 and 3, the damper tube 44 can include a second end 60 that is closed. The piston rod 50 can be fixed to the piston 48 and can extend through the second end 60 of the damper tube 44. The piston rod 50 can include a mounting eye 62 that is connected to the upper linkage 38 in any appropriate manner such as but not limited to a threaded fastener 64. The piston rod 50 can pivot about the longitudinal axis of the threaded fastener 64.

Referring to FIG. 3, the damping adjustment system 16 can include a solenoid 66, a valve 68, a reservoir 70 and a floating piston 72.

The reservoir 70 can include a reservoir chamber 74 in which the piston 72 is located. The floating piston 72 can divide the reservoir chamber 74 into a first portion 74A and a second portion 74B. The first portion 74A of the reservoir chamber 74 can include a fluid that can selectively flow between the first portion 74A and the chamber 52 of the damper tune 44 under control of the valve 68. The second portion 74B can contain a pressured fluid such as but not limited to a pressurized gas. The floating piston 72 can be include a fluid seal 76 that seals the two portions 74A, 74B from each other.

The valve 68 can be in fluid communication with each of the damper chamber 52 and the first portion 74A of the reservoir chamber 74. The solenoid 66 can be mechanically connected to the valve 68 such that the solenoid 66 moves the valve 68 to selectively open and close fluid communication between the damper chamber 52 and the first portion 74A of the reservoir chamber 74. The controller 18 can be configured with hardware alone or in combination with software to selectively energize and de-energize the solenoid 66 based on the exemplary parameter(s) described above in order to control the fluid communication between the chambers 52, 74. Thus, the valve 68 can permit the controller 18 to vary the damping setting for the shock absorber 14.

The wire harness 20 can be in electrical communication with the controller 18 and the solenoid 66 such that the wire harness 20 can supply power to the solenoid 66 and transmit electrical signals between the controller 18 and the solenoid 66. Referring to FIG. 5, the wire harness 20 can include one or more electric wires 80 and a wire harness coupler 78 electrically connected to the each of the electric wires 80.

Figure 4:
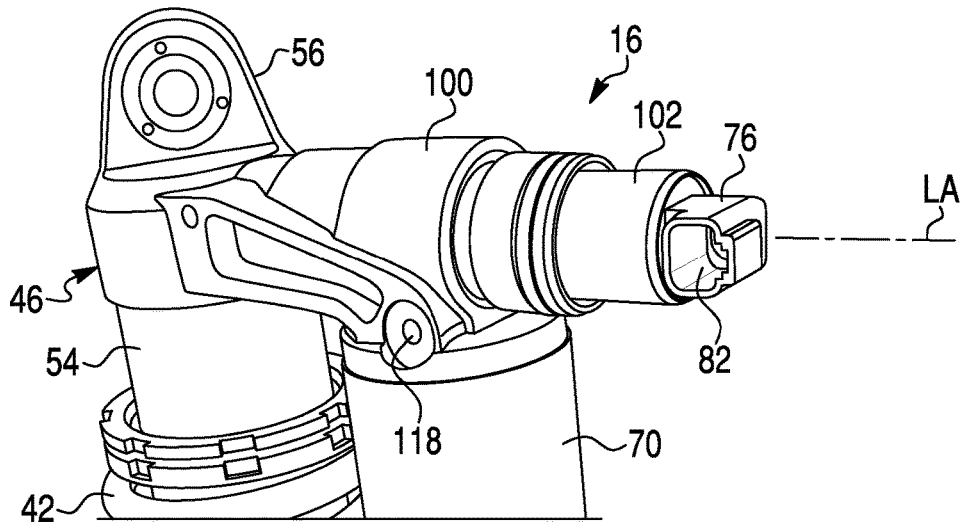
FIG. 4 is a partial perspective view of the shock absorber of FIG. 2 with a protective cover and a wire harness removed.

Referring to FIGS. 3-5 collectively, the wire harness connection 22 can include the solenoid coupler 76 and the wire harness coupler 78. The solenoid 66 can be in electrical communication with the solenoid coupler 76. FIG. 3 schematically shows the couplers 76, 78 connected together. FIG. 5 shows the wire harness coupler 78 connected to the solenoid coupler 76 of the wire harness connection 22, with the solenoid coupler 76 obstructed from view by the wire harness coupler 78 and the protective cover 24. The wire harness coupler 78 and the protective cover 24 are omitted from FIG. 4 to more clearly illustrate the solenoid coupler 76.

Referring to FIG. 4, the solenoid coupler 76 can include an opening 82 through which the wire harness coupler 78 can pass and extend into the solenoid coupler 76. The solenoid coupler 76 can include terminals that physically and electrically connect to mating terminals in the wire harness coupler 78 when the wire harness coupler 78 is fully inserted into the solenoid coupler 76.

The solenoid coupler 76 can be located at an end of the body cap 46 that faces toward an outside perimeter of the vehicle 12 and can be exposed to the ambient environment at an exterior surface of the vehicle 12. The wire harness coupler 78 also can be exposed to the ambient environment. Comparing FIGS. 4 and 5, the protective cover 24 can shield the couplers 76, 78 from contact by external objects. For example, the protective cover 24 can extend along a leading side of the solenoid coupler 76 with respect to the forward traveling direction of the vehicle 12 and can extend along a longitudinal direction L of the vehicle 12 such that the protective cover 24 is positioned between the couplers 76, 78 and object(s) adjacent to the vehicle 12 in a transverse direction T of the vehicle 12. (FIG. 1 shows the longitudinal direction L and the transverse direction T of the vehicle 12). Further, FIG. 5 shows the couplers 76, 78 and a portion of the wire harness 20 can be contained in the protective cover 24. Thus, an external object can strike the protective cover 24 instead of the couplers 76, 78.

Referring to FIGS. 5-8 collectively, the protective cover 24 can be an irregularly shaped structure that includes one or more walls, and each of the walls can have undulating surface contours. For example, the protective cover 24 can include a first wall 84, a second wall 86, a third wall 88, a fourth wall 90 and a mounting flange 92. The walls 84, 86, 88, 90 can form a main portion of the protective cover 24 that contains the solenoid coupler 76 and the wire harness coupler 78. The main portion also can contain a portion of the body cap 46. The mounting flange 92 can be configured to secure the protective cover 24 to the body cap 46 so that the protective cover 24 moves with the damper tube 44 during each stroke of one of the piston 48 and the damper tube 44. The protective cover 24 can be formed from any appropriate material such as but not limited to plastic, metal, fiberglass, carbon fiber, or a composite of one or more these materials. For example, the protective cover 24 can be molded from plastic such that the walls 84, 86, 88, 90 and the mounting flange 92 are a single, homogenous unit.

The second wall 86 can be spaced away from and oppose the first wall 84. The solenoid coupler 76 can be located in the space between the first and second walls 84, 86, and portion of the body cap 46 can be contained in the space. The third wall 88 can be connected to and extend from each of the first and second walls 84, 86 so as to close the space on the leading side of the solenoid coupler 76 with respect to the forward traveling direction of the vehicle 12. The fourth wall 90 can be connected to and extend from each of the first, second and third walls 84, 86, 88 so as to close the space in the transverse direction T of the vehicle 12.

Each of the first, second and fourth walls 84, 86, 90 can extend away from the third wall 88 and terminate at a first edge 94, a second edge 96 and a third edge 98, respectively, that is spaced away from the third wall 88. The edges 94, 96, 98 can form a peripheral edge of the protective cover 24 that bounds an opening in the protective cover 24 and the third wall 88 can oppose the opening. The walls 84, 86, 88, 90 can form a space that extends from the opening to the third wall 88. The solenoid coupler 76 and the wire harness coupler 78 can be located in the space and spaced away from the edges 94, 96, 98 such that the couplers 76, 78 are located between the edges 94, 96, 98 and the third wall 88.

Figure 7:
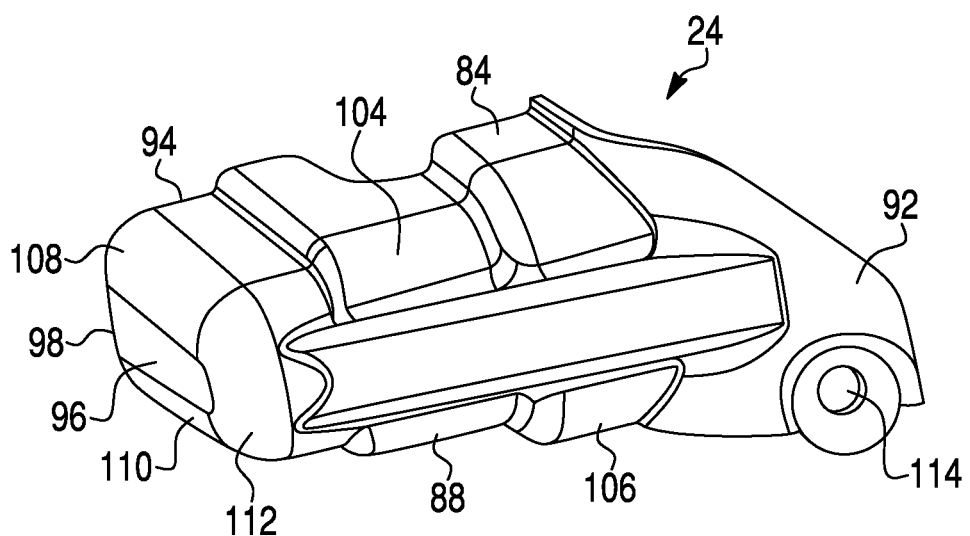
FIG. 7 is perspective view showing a front view of the protective cover.

Referring to FIG. 7, the third wall 88 can include a first curved portion 104 and a second curved portion 106. The first curved portion 104 can abut the first wall 84 and the second curved portion 106 can abut the second wall 86.

The fourth wall 90 can include a first curved portion 108, second curved portion 110 and a third curved portion 112. The first curved portion 108 can abut the first wall 84, the second curved portion 110 can abut the second wall 86 and the third curved portion 112 can abut the third wall 88.

Referring to FIGS. 4-6 and 8, the body cap 46 can include a valve housing 100 and solenoid housing 102. The valve 68 can be located in the valve housing 100 and the solenoid 66 can be located in the solenoid housing 102. The valve housing 100 and the solenoid housing 102 can be collectively referred to as a solenoid valve housing. The valve housing 100 and the solenoid housing 102 can be centered about a longitudinal axis LA. The valve housing 100 and the solenoid housing 102 can be cylindrical members that extend away from the damper tube 44 and the mounting eye 56 of the body cap 46 along the longitudinal axis LA.

The longitudinal axis LA can extend between the first and second walls 84, 86 and can be spaced away from the third wall 88. Although the first, second and third walls 84, 86, 88 can have undulations or otherwise not be perfectly flat, the first, second and third walls 84, 86, 88 generally can extend along the longitudinal axis LA. For example, the first, second and third walls 84, 86, 88 can be parallel to the longitudinal axis LA or substantially parallel to the longitudinal axis LA such that one skilled in the art would perceive the walls 84, 86, 88 as being parallel to the longitudinal axis LA. Further, each of the first and second walls 84, 86, can extend along the solenoid coupler 76 and the wire harness coupler 78 and toward the damper tube 44 in a direction that is parallel to the longitudinal axis LA. The third wall 88 can extend along the front side of the solenoid coupler 76 and toward the damper tube 44 in the direction that is parallel to the longitudinal axis LA. Each of the first, second and third walls 84, 86, 88 can extend along a portion of the solenoid housing 102 in a direction that is parallel to the longitudinal axis LA.

The fourth wall 90 can extend along each of the solenoid coupler 76 and the wire harness coupler 78 in a direction that intersects the longitudinal axis LA. For example, the fourth wall 90 can be orthogonal to each of the longitudinal axis LA and the first, second and third walls 84, 86, 88.

Referring to FIGS. 7 and 8 collectively, the mounting flange 92 can be connected to and extend away from at least the third wall 88 and toward the damper tube 44 generally along the longitudinal axis LA. The mounting flange 92 can include a through hole 92. A threaded fastener 116 can pass through the through hole 114 and into the body cap 46 to secure the mounting flange 92 to the body cap 46. The body cap 46 can include a blind hole or a through hole 118 shown in FIGS. 4 and 5. The threaded fastener 116 can be threaded into the blind hole of the through hole 118 directly or inserted through the through hole 118 and tightened against the body cap 46 and the mounting flange 92 with a nut on the opposite of the body cap 46 from the mounting flange 92.

Figure 6:
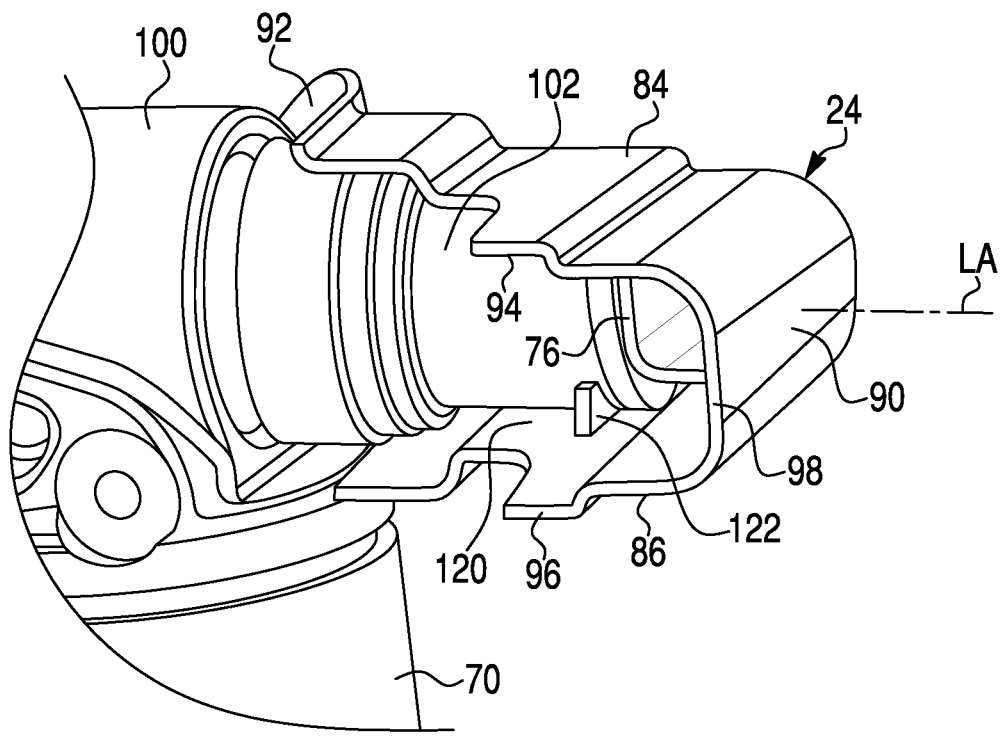
FIG. 6 is a partial perspective view of the shock absorber of FIG. 2 with the protective cover attached and the wire harness removed and showing a rear view of the protective cover.

Referring to FIG. 6, the second wall 86 can include an inner surface 120 and a projection 122. The inner surface 120 can oppose the solenoid coupler 76 and the solenoid housing 102. The projection 122 can extend from the inner surface 120 and abut the solenoid housing 102. The projection 122 can have a generally triangular shape with one edge that conforms to the shape of the portion of the solenoid housing 102 that the projection 122 abuts. The projection 122 can resist displacement of the protective cover 24 away from the solenoid coupler 76 in the longitudinal direction L of the vehicle 12.

Thus, the protective cover 24 can shield the solenoid coupler 76 and the wire harness coupler 78 from contact with an object that is external to the vehicle 12. Further, the protective cover 24 can be connected to the damper tube 44 such that the protective cover 24 moves with the damper tube 44 during each stroke of the piston 48.

Referring to FIG. 3, the damping adjustment assembly 16 can include one or more inputs 124 that can provide data to the controller 18 that is indicative of the position of the suspension system 10, yaw angle, roll angle, pitch angle, yaw rate, roll rate, pitch rate, steering input, brake pressure, engine speed, and selected transmission gear ratio. The input(s) 124 can include an input from the operator of the vehicle 12 that can enable or disable the damping adjustment assembly 16 or permit the operator to select one of a plurality of predetermined damper settings or a range of predetermined damper settings. Electrical communication lines (not numbered) can connect the controller 18 to the input(s) 124. The controller 18 also can be referred to as an electronic control unit (ECU) or as a central processing unit. The controller 18 can be configured with hardware, with or without software, to perform the assigned task(s).

While certain embodiments of the invention are described above, it should be understood that the invention can be embodied and configured in many different ways without departing from the spirit and scope of the invention.

For example, embodiments of the protective cover 24 are disclosed above in the context of a single, homogenous construction. However, exemplary embodiments can include a protective cover that includes two or more pieces that are connected together. Further, exemplary embodiments can include more than a single protective cover such that the plurality of protective covers can provide a level of protection for the wire harness connection that is commensurate with a single protective cover such as but not limited to the exemplary protective cover 24.

Alternate embodiments can include a protective cover 24 that includes one or more flat walls in place of any one of or any combination of the irregularly contoured walls 84, 86, 88, 90.

Alternate embodiments can include a protective cover 24 that is stamped and bent or otherwise deformed into the desired shape from a sheet of metal. The resultant protective cover 24 can include gaps between some or all of the walls 84, 86, 88, 90 in order to facilitate the deformation of the sheet into the desired shape.

The protective cover 24 can include a lid that is releasably connected to each of the first wall 84 and the second wall 86 and covers a portion of the opening 82 such that the lid and the walls 84, 86 enclose at least a portion of the solenoid housing 102.

The orientation of the shock absorber 14 can be reversed such that the mounting eye 56 of the body cap 46 is connected to the upper linkage 38 and the mounting eye 62 of the piston rod 50 is connected to the cushion bracket 32. In this alternate embodiment, the damper tube 44 can stroke relative to piston 48 and the protective cover 24 will move with the damper tube 44.

Instead of connecting the coil spring 42 to different portions of the shock absorber 14 that move relative to each other, the coil spring 42 can have a first end connected to the frame assembly 26 and a second end connected to one of the linkages 36, 38.

Instead of the single tube shock absorber 14, embodiments can include a shock absorber that includes two telescoping tubes with a piston fixed to one of the tubes. The double-tube shock absorber can be configured such that the piston and a second one of the tubes can move relative to each other.

Embodiments are disclosed above in the context of the wheel suspension system 10 supporting a front wheel of the vehicle 12. However, embodiments can include the wheel suspension system 10 supporting a rear wheel of the vehicle 12.

Embodiments are disclosed above in the context of a vehicle 10 made from a plurality of frame members shaped as beams and tubes as shown in FIG. 1. However, embodiments are intended to include or otherwise cover any type of vehicle construction such as but not limited to a space frame and panel assembly, a body on frame assembly, a monocoque and panel assembly, or a unibody assembly.

FIGS. 1 and 2 show a suspension system that includes a pair of linkages 36, 38. However, exemplary embodiments can include any number of linkages including a single suspension member such as a torsion beam (also referred to as twist beam).

The disclosed wheel suspension system 10 can be used with any vehicle that is configured for travel along any one or combination of improved, unimproved, and unmarked paths. For example, embodiments are intended to include or otherwise cover any type of automobile, including a passenger car, minivan, truck, SUV, other types of all-terrain vehicle (ATV), semi-tractor, off-highway vehicle, etc.

What is claimed is:

1. A shock absorber for damping movement of a wheel suspension system of a vehicle, the shock absorber comprising:
    a damper tube containing a fluid;
    a piston located in the damper tube so as to accommodate relative movement between the damper tube and the piston;
    a damping adjustment assembly connected to the damper tube, the damping adjustment assembly includes,
        a reservoir;
        a solenoid valve in fluid communication with each of the reservoir and the damper tube and configured to selectively open and close fluid communication between the reservoir and the damper tube, and
        a wire harness connection in electrical communication with the solenoid valve; and
    a protective cover containing the wire harness connection, the protective cover includes an opposing wall that opposes the wire harness connection, the protective cover terminates at a peripheral edge that is spaced away from the opposing wall, and the wire harness connection is located between the opposing wall and the peripheral edge.

2. The shock absorber according to claim 1, wherein the wire harness connection includes a solenoid coupler in electrical communication with the solenoid, and
    the protective cover contains the solenoid coupler.

3. The shock absorber according to claim 2, wherein the solenoid coupler includes an opening,
    the wire harness connection further includes a wire harness coupler extending through the opening of the solenoid coupler and into the solenoid coupler, and the wire harness coupler is electrically connected to the solenoid coupler,
    the damping adjustment assembly further includes an electric wire electrically connected to and extending out of the wire harness coupler, and
    the protective cover contains the wire harness coupler.

4. The shock absorber according to claim 3, further comprising:
    a body cap connected to the damper tube; and
    a fastener, wherein
    the protective cover includes,
        a main portion that contains the solenoid coupler and the wire harness coupler, the main portion includes the opposing wall, and
        a mounting flange that extends from the main portion and includes a through hole, and
    the fastener extends through the through hole and into the body cap.

5. The shock absorber according to claim 4, wherein the damping adjustment assembly further includes a solenoid housing and the solenoid valve is contained in the solenoid housing, and
    the main portion includes,
        an inner surface that opposes the solenoid coupler and the solenoid housing, and
        a projection that extends from the inner surface and abuts the solenoid housing.

6. The shock absorber according to claim 1, further comprising:
    a body cap connected to an end of the damper tube, and the body cap is configured to be connected to a structure of the vehicle such that the body cap and the damper tube pivot with respect to the structure of the vehicle during relative movement between the piston and the damper tube, wherein
    the damping adjustment assembly further includes a solenoid housing connected to and extending from the body cap,
    at least a portion of the solenoid valve is contained in the solenoid housing, and
    the protective cover is connected to the damper tube at the solenoid housing.

7. The shock absorber according to claim 6, wherein the protective cover includes,
    a first wall that extends along the solenoid housing, and
    a second wall that extends along the solenoid housing, and the second wall opposes and is spaced away from the first wall, and
    the wire harness connection is located between the first wall and the second wall.

8. The shock absorber according to claim 7, wherein the second wall includes,
    a second wall inner surface that opposes the solenoid housing, and
    a projection that extends away from the second wall inner surface and toward the first wall, and the projection engages the solenoid housing.

9. The shock absorber according to claim 7, wherein the opposing wall extends along the wire harness connection and is connected to and extends from each of the first wall and the second wall,
    the protective cover further includes,
        a fourth wall connected to each of the first wall, the second wall, and the opposing wall, and
        a mounting flange connected to and extending away from the opposing wall, and
    each of the first wall, the second wall, and the fourth wall extend from the opposing wall to the peripheral edge.

10. The shock absorber according to claim 6, wherein the protective cover includes,
    an inner surface that opposes the solenoid housing, and
    a projection that extends from the inner surface and engages the solenoid housing.

11. The shock absorber according to claim 1, wherein the protective cover is connected to the damper tube such that the protective cover moves with the damper tube during each stroke of one of the piston and the damper tube.

12. The shock absorber according to claim 1, wherein the damping adjustment assembly includes a valve housing that is centered about a longitudinal axis, the solenoid valve is contained in the valve housing,
    the protective cover includes,
        an opening that opposes the opposing wall,
        a first portion that extends from the opening, wraps around a portion of the wire harness connection and the solenoid valve housing, extends along the wire harness connection, and includes the opposing wall, and a second portion that is connected to the first portion, extends along the wire harness connection, and intersects the longitudinal axis, and the wire harness connection is located between the opening and the opposing wall.

13. A protective cover for an electrical coupler of a vehicle shock absorber, the shock absorber having a damper tube, a reservoir, a valve housing, and a solenoid valve mounted in the valve housing and in fluid communication with each of the damper tube and the reservoir, the electrical coupler is in electrical communication with the solenoid valve, and the solenoid valve is configured to selectively open and close fluid communication between the damper tube and the reservoir, the protective cover comprising:

a first wall configured to extend along the electrical coupler when the protective cover is connected to the shock absorber, a second wall configured to extend along the electric coupler when the protective cover is connected to the shock absorber, and the second wall opposes and is spaced away from the first wall such that the electrical coupler is located between the first wall and the second wall when the protective cover is connected to the shock absorber, a third wall connected to and extends from each of the first wall and the second wall, a fourth wall connected to each of the first wall, the second wall, and the third wall and configured to extend along the electrical coupler when the protective cover is connected to the shock absorber, and a peripheral edge spaced from the third wall, each of the first wall, the second wall and the fourth wall extend from the third wall to the peripheral edge, and the electrical coupler is located between the third wall and the peripheral edge when the protective coupler is connected to the shock absorber.

14. The protective cover according to claim 13, wherein the second wall includes, an inner surface that opposes the valve housing when the protective cover is connected to the shock absorber, and a projection that extends away the inner surface and toward the first wall, and the projection engages the valve housing when the protective cover is connected to the shock absorber.

15. The protective cover according to claim 14, further comprising:

a mounting flange extending from the third wall and configured to be connected to the valve housing.

16. An adjustable shock absorber for damping movement of a wheel suspension system of a vehicle, the adjustable shock absorber comprising:

a damper tube containing a fluid;

a piston located in the damper tube so as to accommodate relative movement between the damper tube and the piston;

a solenoid valve housing centered about a longitudinal axis, and connected to and extending away from the damper tube along the longitudinal axis;

a reservoir connected to and extending away from the solenoid housing;

a solenoid valve located in the solenoid valve housing, in fluid communication with each of the reservoir and the damper tube, and configured to selectively open and close fluid communication between the reservoir and the damper tube;

a wire harness connection in electrical communication with the solenoid valve; and a protective cover partially wrapped around the solenoid valve housing and the wire harness connector such that the protective cover includes an opening spaced away from each of the wire harness connection and the longitudinal axis and extending substantially parallel to the longitudinal axis, wherein the protective cover includes, a first portion that extends from the opening, wraps around a portion of the wire harness connection and the solenoid valve housing, and extends along the wire harness connection and the solenoid valve housing in a direction toward the damper tube that is substantially parallel to the longitudinal axis, and a second portion that is connected to the first portion, and extends along the wire harness connection and intersects the longitudinal axis.

17. The adjustable shock absorber according to claim 16, wherein the protective cover includes, a first wall extending along the wire harness connection and along the longitudinal axis, and extending from the opening, a second wall extending along the wire harness connection and along the longitudinal axis, and extending from the opening, and the second wall opposes and is spaced away from the first wall such that the wire harness connection is located between the first wall and the second wall, a third wall that connected to and extending from each of the first wall and the second wall, the third wall extends along the wire harness connection and along the longitudinal axis, and the third wall is spaced away from and opposes the opening, a fourth wall connected to each of the first wall, the second wall, and the third wall, extending along the wire harness connector, and intersecting the longitudinal axis.

18. The adjustable shock absorber according to claim 16, further comprising:

a body cap connected to one end of the damper tube and including, a mounting structure configured to movably secure the damper tube to the vehicle, a solenoid coupler in electrical communication with the solenoid valve, and the solenoid valve housing;

a wire harness including a wire harness coupler and at least one electric wire electrically connected to the wire harness coupler and extending away from the wire harness coupler, wherein the solenoid valve housing is connected to and extends from each of the reservoir and the solenoid coupler, the wire harness coupler is connected to in in electrical communication with the solenoid coupler to form the wire harness connection, and the protective cover is fixed to the body cap and includes a projection that engages the solenoid valve housing.

19. The adjustable shock absorber according to claim 16, wherein the protective cover includes a mounting flange that extends away from the first portion and toward the damper tube along the longitudinal axis.

20. The adjustable shock absorber according to claim 16, wherein the protective cover includes, an inner surface that opposes the solenoid valve housing, and a projection that extends away from the inner surface and engages the solenoid valve housing.

* * * * *